United States Patent Office 3,600,416

Patented Aug. 17, 1971

1

3,600,416

ORGANOTIN (PHENYLOXYCARBONYL) PHENOLATES

Toshio Seki, 104 Higashimikuni-cho 2-chome Higashiyodogawa-ku, Osaka-shi, Japan; Kozaburo Suzuki, 452 Motoyama-cho Mori Higashinada-ku, Kobe-shi, Japan; and Takashi Matsuzaki, 30 Furuichikita-dori 5-chome Joto-ku, Osaka-shi, Japan No Drawing. Original application Sept. 9, 1966, Ser. No. 578,140, now Patent No. 3,505,383, dated Apr. 7, 1970. Divided and this application June 24, 1969, Ser. No. 871,017

Int. Cl. C07f 7/22; C08f 45/62

U.S. Cl. 260—429.7 7 Claims

ABSTRACT OF THE DISCLOSURE

This invention relates to organotin (phenyloxycarbonyl) phenolates which are useful for stabilizing synthetic resins against the degrading effect of ultraviolet light.

This invention relates to novel organotin compounds, to the preparation of such compounds, and to synthetic resins stabilized with said organotin compounds. This application is a divisional application of Ser. No. 578,140, filed on Sept. 9, 1966, now U.S. Pat. No. 3,505,383.

Synthetic resins, for example, ABS (acylonitrile-butadiene-styrene) resin, cellulose plastics, acetal resin, fluoroplastics, acrylic resins, chlorinated polyethers, alkyd resins, amino resins, urethane resins, epoxy resins, polyamide resins, phenoxy resins, furan resins, phenol resins, polyimides, polycarbonates, unsaturated polyesters, polyethylene, polypropylene, polystyrene, polyvinyl chlorides, synthetic rubbers, etc. mentioned in Modern Plastics Encyclopedia Issue for 1965, volume 42, No. 1A, pages 113–271 are apt to be affected by light, especially by ultraviolet light.

It is known that certain organic compounds may be added as ultraviolet light absorbers to such synthetic resins which are susceptible to degradation by ultraviolet light.

Certain of these ultraviolet light absorbers now in common use, may be characterized by unsatisfactory stabilizing ability because of thermal decomposition, volatilization, and sublimation during the process of producing films, fibers, or other molded articles. These compounds have a further defect in that when they are added to synthetic resins, such as polyvinyl chloride, they may promote the heat-deterioration of such resins. When the synthetic resins are processed at a temperature above 200° C., for example, these defects become even more pronounced. In addition, when these known stabilizers are added to fibers, which are to be washed or dry-cleaned, decreasing of stabilizing effect by washing and considerable discoloration due to the reaction of extremely small quantities of metal ion or cleaning material with the stabilizers may often be observed. Therefore it is important for ultraviolet absorbers to bear their own good thermal stability, less sublimation, and other chemical stability as well as ability in light-stabilizing synthetic resins.

2

According to the present invention, these adverse effects may be reduced or eliminated by employing a new class of organotin compounds as stabilizers.

It is an object of this invention to provide novel organotin compounds and methods of producing such compounds. A further object of this invention is to provide synthetic resins stabilized with one or more of these novel organotin compounds. Other objects will be apparent to those skilled-in-the-art from the following description.

In accordance with certain of its aspects, the method of this invention for stabilizing synthetic resins against the degrading effect of ultraviolet light comprises incorporating into said resin an inhibiting amount of a compound having the following formula:

(I)

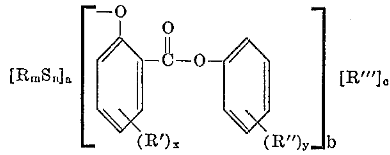

wherein (1) R is selected from the group consisting of an alkyl, cycloalkyl, and aryl;

(2) each of R′ and R″ is independently selected from the group consisting of alkyl, phenyl, alkoxy, hydroxyl, halogen, carboxyl, and benzoyl (in which said hydroxyl and carboxyl groups may be attached to the tin atom via the hydroxyl-oxygen atom by removal of the hydrogen atom from said groups);

(3) R‴ is selected from the group consisting of hydroxyl; carboxylic acid $$R^{*}C(=O)-O-$$

wherein R* is hydrogen or hydrocarbon; mercaptan ZS— wherein Z is an alkyl group; monovalent mercapto ester formed by removal of the hydrogen atom from the mercaptan portion of the ester molecule; and monovalent monoester maleate residues formed by removal of the hydrogen atom from the carboxyl of said maleate monoester, (4) $c$ is an integer 0–2, (5) $a$, $b$, and $m$ is each an integer 1–3, (6) $x$ and $y$ is each an integer 0–3, (7) R‴ may be the divalent oxygen atom, and, (8) each unsubstituted atom in said compound is bonded to a hydrogen atom.

Examples of suitable alkyl groups (R, R′, and R″) include methyl, ethyl, n-propyl, i-propyl, n-butyl, sec.-butyl, tert-butyl, n-amyl, i-amyl, as well as isomeric hexyl, heptyl, octyl, nonyl, decyl, undecyl, and dodecyl groups. In addition, R may be a tridecyl, tetradecyl, pentadecyl, hexadecyl, heptadecyl, or octadecyl group. Substituted alkyls including benzyl may be employed. When R is a cycloalkyl group, R may be a cycloalkyl group of from 3 to 12 carbon atoms such as cyclopropyl, cyclobutyl, cyclohexyl, cycloheptyl, 2-ethyl-cyclohexyl, 3,4,5-trimethyl-cyclopentyl, etc. Suitable alkoxy groups (R' and R") include methoxy, ethoxy, propoxy, butoxy, pentoxy, etc. represented by the formula $(OC_kH_{2k})H$ wherein $k$ is an integer from 1 to 12. Similarly, each R''' may be a mercapto group of the formula: $(SC_mH_{2m})H$ where $m$ is an integer from 1 to 18. When R''' is a mercapto acid ester residue, R''' may have the formula:

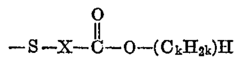

wherein X is an alkylene, alkenylene, or alkylidene group of from 1 to 6 carbon atoms and $k$ is an integer of from 1 to 12. When R is an aryl group, suitable aryl groups may include phenyl, tolyl, xylyl, and naphthyl.

In accordance with certain aspects of this invention, organotin compounds included in Formula I may be prepared by heating a compound (1) of the formula:

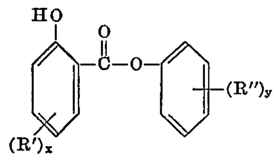

wherein R', R", $x$, and $y$ are as defined above with (2) a tri-, di-, or mono-organotin oxide (or alkoxide) in a suitable inert solvent medium such as benzene, toluene, etc. Other compounds within the general Formula I may be prepared by heating compounds (1) and (2) in the presence of a mercaptan (usually of from 1 to 18 carbon atoms), a mercapto acid ester (usually of from 2 to 18 carbon atoms), a carboxylic acid (usually of from 1 to 18 carbon atoms), or a monoester maleate (usually of from 5 to 22 carbon atoms).

The novel organotin compounds of this invention may be colorless to light yellow, crystalline or non-crystalline substances, depending upon the R, R', R", R''' radicals, and the value of $a$, $b$, $c$, $m$, $x$, and $y$ in the general Formula I. The compounds may be soluble in those general organic solvents which have a boiling point in the range of 40 to 300° C., e.g. aromatic hydrocarbons, alcohols, ethers, esters, ketones, petroleum hydrocarbon, etc. The low volatility of these organotin compounds make them especially useful as stabilizers in synthetic resin formulations which require heat or exposure to elevated temperature during use or during the processing of the synthetic resin material.

Specific examples of the organotin compounds which are within the scope of this invention include, among others, the following:

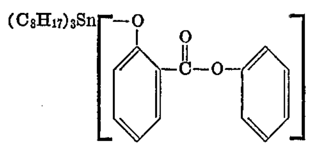

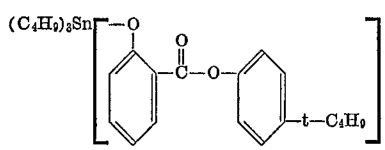

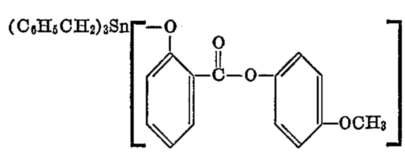

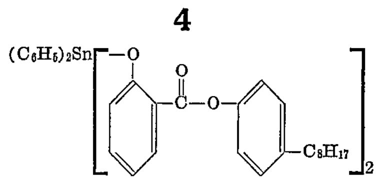

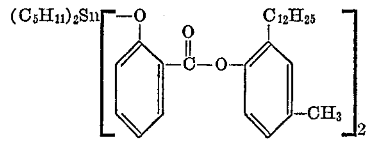

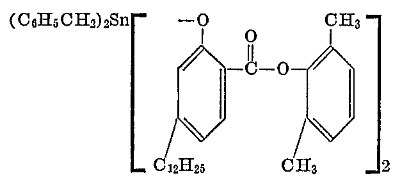

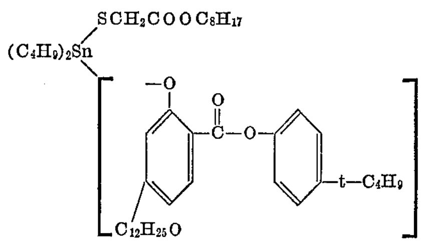

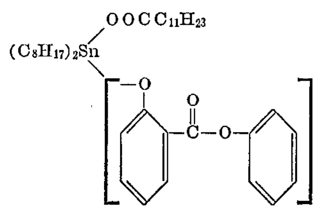

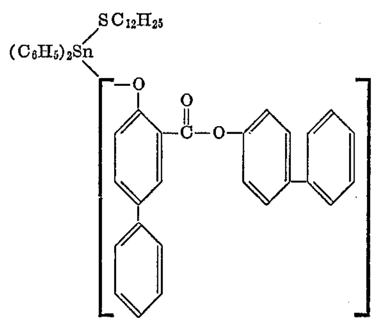

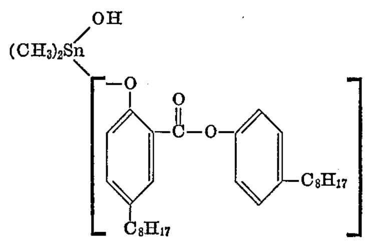

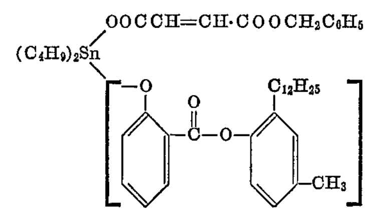

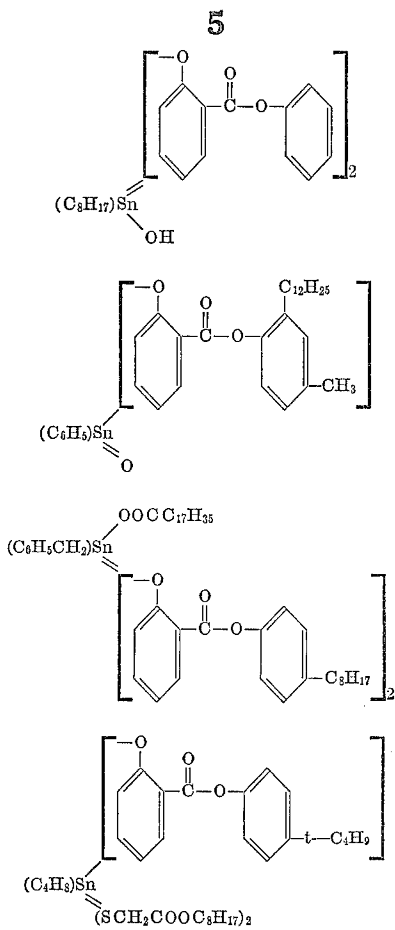

These organotin ultraviolet light absorbers and stabilizers may be combined with or incorporated into the synthetic resins in several ways. For instance, the organotin compound or mixture of compounds may be added to the synthetic resins prior to polymerization or polycondensation. After the addition of the organotin compound, the admixture may be polymerized or polycondensed and molded into films, fibers, or other articles. Alternatively, the organotin compound may be added to the synthetic resin together with other additives such as another stabilizer, an anti-oxidant, a coloring agent, a mold lubricant, etc. by mixers, e.g. a ribbon blender, a high-speed mixer, a stirring mixer, etc. after which the mixture may be molded into films, fibers, or other articles. In addition, films, fibers, or other articles may be treated with solutions, suspensions or emulsions of the organotin stabilizers and ultraviolet light absorbers by immersing or spreading. It is also possible to add the organotin stabilizers and ultraviolet light absorbers to solutions, suspensions, or emulsions of the synthetic resins.

Only an inhibiting amount of organotin compound is required. Preferably, the amount of the organotin stabilizers and ultraviolet light absorbers to be employed in the process of this invention is in the range of about 0.001 to 5% by weight based on the weight of the synthetic resins, which will vary depending upon the kind of molded articles and the manner in which the organotin compounds are added.

The organotin compounds of this invention are especially useful in the production of the synthetic resins when these resins are molded or polymerized at a relatively high temperature. Often conventional stabilizers and ultraviolet light absorbers actually stimulate the thermal decomposition of resins at temperatures above about 170° C. For example, when R''' is the residue of mercaptan $[(SC_mH_{2m})H$; $m$ is an integer of from 1 to 18], mercapto acid ester (such as $$-S-X-\overset{\overset{O}{\|}}{C}-O(C_kH_{2k})H$$

wherein X is an alkylene, alkenylene, or alkylidene group of from 1 to 6 carbon atoms and $k$ is an integer of from 1 to 12) carboxylic acid or monester maleate in general Formula I, the organotin stabilizers of the invention can also impart resistance to heat to synthetic resins which are susceptible to effects of thermal oxidation, e.g. ABS resins, chlorine-containing resins, polyolefins, etc.

The following examples are submitted for the purpose of illustration only and are not to be construed as limiting the scope of the invention in any way.

In the examples a series of tests were carried out comparing the effects of various organotin compounds according to the following procedure: A blackboard (which was set at an angle of 45° on the south) was lined with test specimens, and exposed to sunlight and weathering outdoors. The specimens were then checked for a change (usually a decrease) of impact strength (Du Pont Type Impact Machine), discoloration, or degree of cracking. All specimens were given the same exposure and all parts are by weight unless otherwise indicated. The volatility of each organotin compound was compared with the volatility of the corresponding salicyclic compound.

EXAMPLE 1

One-tenth mole of p-biphenylyl salicylate (A) was reacted with one-tenth mole of trioctyltin methoxide in 200 cubic centimeters of toluene under reflux conditions for 6 hours. The solvent was then distilled off under reduced pressure to give a compound (B) of the formula:

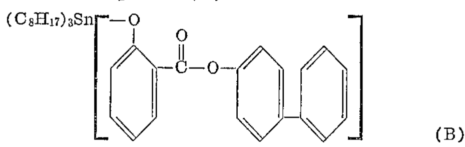

In order to provide a comparison as to the volatility by heat of the compounds (A) and (B), the two compounds were left in a Geer oven at 180° C. for 0.5 hour and the weight losses were examined. Only 1.2% of the compound (B) disappeared compared with a 14% loss of the compound (A). The infra-red spectra of the compound (B) were practically the same before and after the heat treatment, indicating good heat stability.

Five-tenths gram of the organotin compound (B) was added to 100 grams of styrene, the mixture was polymerized by heating at 100° C. for 2 days, and a sheet was made from the polymer thus obtained. The degree of discoloration (as measured by the increase of yellow color of the sheet) was about 1/30 of that of the control sheet which was made by the same procedure as above, but contained no ultraviolet light absorbers.

EXAMPLE 2

Two-tenths mole of 2-dodecyl-4-methyl phenyl salicylate (C) was reacted with 1/10 mole of bis-(tributyltin)-oxide in 200 cc. of benzene under reflux conditions for 6 hours. The benzene was then distilled off under reduced pressure to give a compound (D) of the formula:

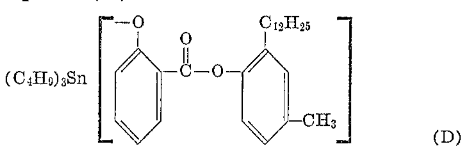

The compounds (C) and (D) were tested for volatility by the same procedure as in Example 1. The percent by weight of each compound which was lost was as follows: (C), 8.0%; (D), only 1.3%.

A film of polyethylene glycol terephthalate having a thickness of 0.05 millimeter was immersed in an acetone solution containing 2% by weight of organotin compound (D) at 10° C. for 30 seconds, and the impregnated film was then dried at 180° C. for 30 seconds. The treated film had a life of more than three times as long as untreated film when both were exposed to ultraviolet light for the same length of time.

EXAMPLE 3

Two-tenths mole of 4-tertiary butyl phenyl-4-dodecyloxy salicylate (E) was reacted with 1/10 mole of diamyltin oxide in 200 cubic centimeters of toluene under reflux conditions for 6 hours. The toluene was then distilled off under reduced pressure to give a compound (F) of the formula:

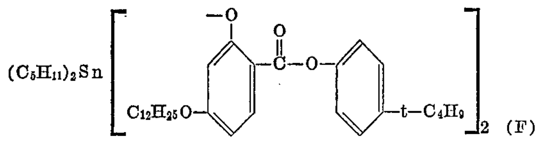

The compounds (E) and (F) were tested for volatility by the same procedure as in Example 1 giving the following percents by weight of each compound which was lost: (E), 5.2%; (F), only 0.7%.

100 milligrams of benzoyl peroxide and 0.5 gram of the organotin compound (F) were mixed together in 400 cubic centimeters of methyl methacrylate and the solution was polymerized and molded into hard plates of 2 mm. thickness. The brittleness on exposure to ultraviolet light (denoted as impact value) of the plate containing organotin compound (F) was only 1/5 of that of a plate prepared by the same procedure as above but not containing any ultraviolet light absorbers.

EXAMPLE 4

One-tenth mole of 4-octyl phenyl-5-octyl salicylate (G) was reacted with 1/10 mole of dibutyltin oxide and 1/10 mole of dodecyl mercaptan in 200 cubic centimeters of benzene under reflux conditions for 5 hours. The benzene was then distilled off under reduced pressure to give a compound (H) of the formula:

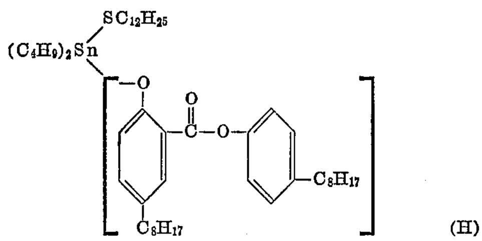

The compounds (G) and (H) were tested for volatility by the same procedure as in Example 1 and gave the following results (percent by weight of each compound lost): (G), 4.2%; (H), only 0.9%.

Two-tenths part by weight of the organotin compound (H) was added to 2,000 parts of 5% polyvinyl chloride solution in methylnaphthalene, and the solution was spread out on a glass plate. The methylnaphthalene was then stripped off from said glass plate under reduced pressure at 180° C. for 10 minutes leaving a colorless, transparent thin film of polyvinyl chloride. This film was not discolored after exposure to sunlight for 12 months.

For comparison purposes, a film without the compound (H), and a film with 0.2 part of the compound (G) were made by the same procedure as above. The initial colors of the two films were yellow. Both films turned brown after exposure to sunlight for 3 months in summer.

From these tests, it was concluded that the organotin compound (H) had extremely low volatility and furthermore, that it rendered the polyvinyl chloride stable not only to light, but also to heat.

EXAMPLE 5

One-tenth mole of o-octyl phenyl salicylate (I) was reacted with 1/10 mole of dibutyltin dimethoxide and 1/10 mole of monobenzyl maleate in 200 cc. of toluene under reflux conditions. The solvent was then distilled off under reduced pressure to give an organotin compound (J) of the formula:

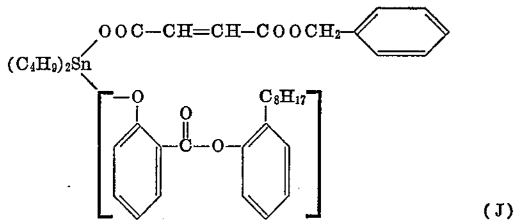

The compounds (I) and (J) were tested for volatility by the same procedure as in Example 1 and gave the following results (percent by weight of each compound lost): (I), 8.0%; (J), 1.0%.

Three parts of dibutyltin-bis-(benzyl maleate) as a stabilizer, 1 part of dibutyltin dilaurate as a lubricant, 0.6 part of the compound (J), and 0.4 part of the compound (H) used in Example 4 were mixed together thoroughly with 100 parts of vinyl chloride resin. The mixture was sheeted on a mixing mill heated at a surface temperature of 180° C. The sheet obtained was colorless and transparent, and gave no coloration after exposure to the sunlight over a long period of 32 consecutive months.

For comparison purposes, a sheet was prepared of the same composition as above, but not containing either of the compounds (J) or (H). Another sheet was prepared containing 1 part of the compound o-octyl phenyl salicylate (I) instead of either of the organotin compounds (J) or (H) in the same manner as above. The former was colorless and transparent, and was not discolored after exposure to the sunlight for 22 consecutive months, but the latter [containing compound (I)] was light yellow in color, and turned brown after exposure to the sunlight for 12 months. From these results, it was concluded that o-octyl phenyl salicylate was not a satisfactory ultraviolet light absorber in view of the fact that this compound had actually accelerated the thermal decomposition of the synthetic resin.

EXAMPLE 6

Two-tenths mole of p-biphenylyl salicylate (A) was reacted with 1/10 mole of monobutyl stanoic acid and 1/10 mole of dodecyl mercaptan in 200 cubic centimeters of toluene under reflux conditions for 6 hours. The toluene was then distilled off under reduced pressure to give a compound (K) of the formula:

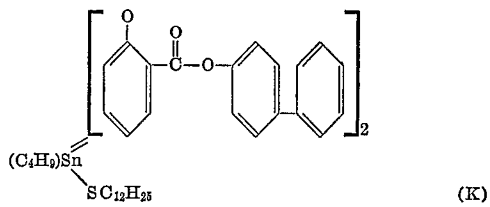

The compounds (A) and (K) were tested for volatility by the same procedure as in Example 1 and gave the following results (percent by weight of each compound lost): (A), 14.0%; (K), only 1.6%.

An amount of each of compounds (A) and (K) was added to separate samples of acrylonitrile-butadiene-styrene terpolymer resins to give a concentration of 0.5 percent by weight of each compound based upon the total weight of the resin and the mixtures were injection molded into flat plates. The plate containing the compound (A) was yellow in color when formed, but the plate containing the organotin compound (K) was white in color. From these results it was concluded that the compound (A) accelerated the thermal decomposition of the ABS resin whereas compound (K) did not. The time required to reduce the impact strength of the plate with the organotin compound (K) by a factor of one-half by means of irradiation with ultraviolet light was 9 to 11 times as long as that of the plate with the compound (A).

EXAMPLE 7

One-tenth mole of phenyl salicylate (L) was reacted with 1/10 mole of diphenyltin oxide and 1/10 mole of lauric acid in 600 cubic centimeters of heptane under reflux conditions for 8 hours. The heptane was then distilled off under reduced pressure to give a compound (M) of the formula:

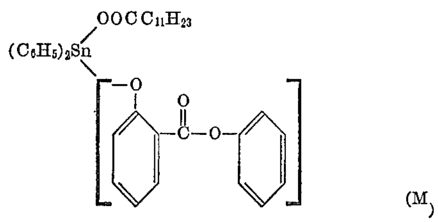

The compounds (L) and (M) were tested for volatility by the same procedure as in Example 1 and gave the following results (percent by weight of compound lost): (L), 12.0%; (M), 0.4%.

A sample of polypropylene containing 0.1% by weight of 2,6-di-tertiary butyl-4-methyl phenol and 0.2% by weight of dilauryl thio-dipropionate, and another sample of polypropylene containing the above two compounds and 0.3% by weight of the compound (M) were each melt extruded. The fibers obtained were pure white in color in each case, whereas the fibers made from polypropylene containing 0.3% by weight of the compound phenyl salicylate (L) instead of the compound (M) was light yellow in color. These fibers were then washed with anionic and non-ionic surfactants and dried in the sun repeatedly. Only the fibers with the compound (L) became noticeably yellow in color after several washings and dryings. The time required for the percentage maximum elongation of the fibers with the compound (M) to be reduced to one-half or the original value due to irradiation with ultraviolet light was 22 times as long as in case of the fibers without any ultraviolet light absorbers, and was 8 times as long as in case of the fibers with the compound (L).

EXAMPLE 8

Two-tenths mole of 2-dodecyl-4-methyl phenyl salicylate (C) was reacted with 1/10 mole of monooctyl stannoic acid in 600 cc. of hexane under reflux for 4 hours. The hexane was then distilled off under reduced pressure to give a compound (N) of the formula:

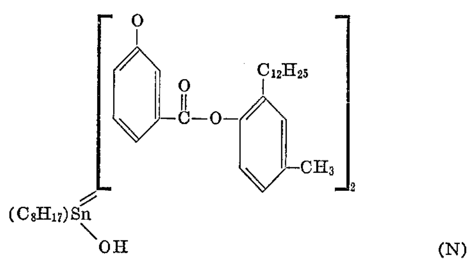

The compounds (C) and (N) were tested for volatility by the same procedure as in Example 1 and gave the following results (percent by weight of compounds lost): (C), 8.0%; (N), 0.9%.

An amount of the compound (N) sufficient to give a 1.5 percent by weight concentration was added to polyethylene, and the mixture was extruded into a film of 0.6 mm. thickness. For comparison purposes, an additional film was prepared from polyethylene without any additive by the same technique. Both of the films were colorless. These films were exposed to ultraviolet light until their impact strength was reduced by one-half of the original value in order to test them for resistance to degradation by ultraviolet light. The polyethylene film containing the organotin compound (N) had to be exposed to ultraviolet light 17 times as long as the polyethylene film containing the compound (C) in order to reduce the impact strength by a factor of one-half.

Although this invention has been illustrated by reference to specific examples, numerous changes and modifications thereof which clearly fall within the scope of the invention will be apparent to those skilled-in-the-art.

We claim:

1. A compound of the formula:

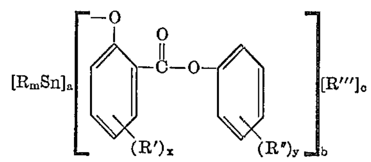

wherein (1) each R is independently selected from the group consisting of an alkyl group, a cycloalkyl group, and an aryl group, (2) each of R′ and R″ is independently selected from the group consisting of an alkyl group, an alkoxy group, hydroxyl, halogen, carboxyl, and benzoyl (in which said hydroxyl and carboxyl groups are attached to the tin atom via the hydroxyl-oxygen atom by removal of the hydrogen atom from said groups), (3) R‴ is selected from the group consisting of hydroxyl, a group of the formula $$R^*-\overset{O}{\overset{\|}{C}}-O-$$

wherein R* is hydrogen or a hydrocarbon group, a group of the formula ZS— wherein Z is an alkyl group, a monovalent mercapto ester group formed by removal of the hydrogen atom from the mercaptan portion of the ester molecule, and monovalent monoester maleate residues formed by removal of the hydrogen atom from the carboxyl group of the maleate monoester, (4) $c$ is an integer of from 0–2 which represents the number of R‴ groups in the molecule.

(5) $a$, $b$ and $m$ each is an integer 1–3.

(6) $x$ and $y$ each is an integer 0–3.

(7) R‴ may be the divalent oxygen atom, and (8) each unsubstituted atom in said compound is bonded to a hydrogen atom.

2. A compound according to claim 1 wherein each of R*, R, R′, R″, R‴, and Z contain less than about 18 carbon atoms.

3. A compound of the formula:

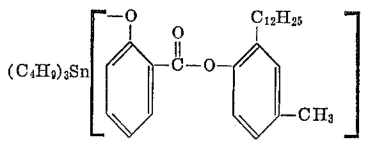

4. A compound of the formula:

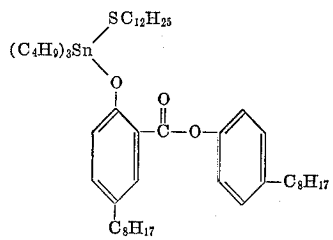

5. A compound of the formula

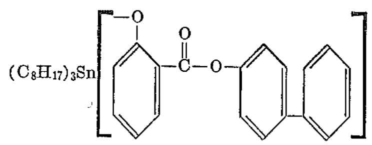

6. A compound of the formula:
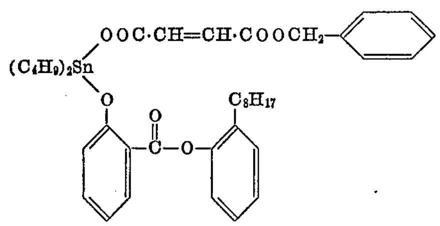
7. A compound of the formula:
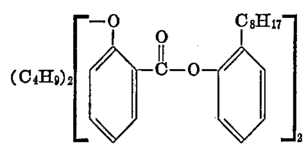
References Cited
UNITED STATES PATENTS
| | | | |
|---|---|---|---|
| 3,099,668 | 7/1963 | Zweigle et al. | 260—429.7 |
| 3,129,236 | 4/1964 | Weissenberger | 260—429.7 |
| 3,240,795 | 3/1966 | Ramsden | 260—429.7 |
| 3,409,653 | 11/1968 | Stamm | 260—429.7 |
TOBIAS E. LEVOW, Primary Examiner
W. F. W. BELLAMY, Assistant Examiner
U.S. Cl. X.R.
260—45.75

UNITED STATES PATENT OFFICE
CERTIFICATE OF CORRECTION

Patent No. 3,600,416 Dated August 17, 1971

Inventor(s) Toshio Seki, Kozaburo Suzuki, and Takashi Matsuzaki

It is certified that error appears in the above-identified patent and that said Letters Patent are hereby corrected as shown below:

In Claim 4, " $(C_4H_9)_3Sn<$ " should read

--$(C_4H_9)_2Sn<$ --.

Signed and sealed this 28th day of November 1972.

(SEAL)
Attest:

EDWARD M.FLETCHER,JR.
Attesting Officer

ROBERT GOTTSCHALK
Commissioner of Patents